March 10, 1931.   J. MANGIN   1,796,036
COMBINATION RECEPTACLE AND SUPPORT FOR ELECTRIC FIXTURES
Filed March 24, 1930
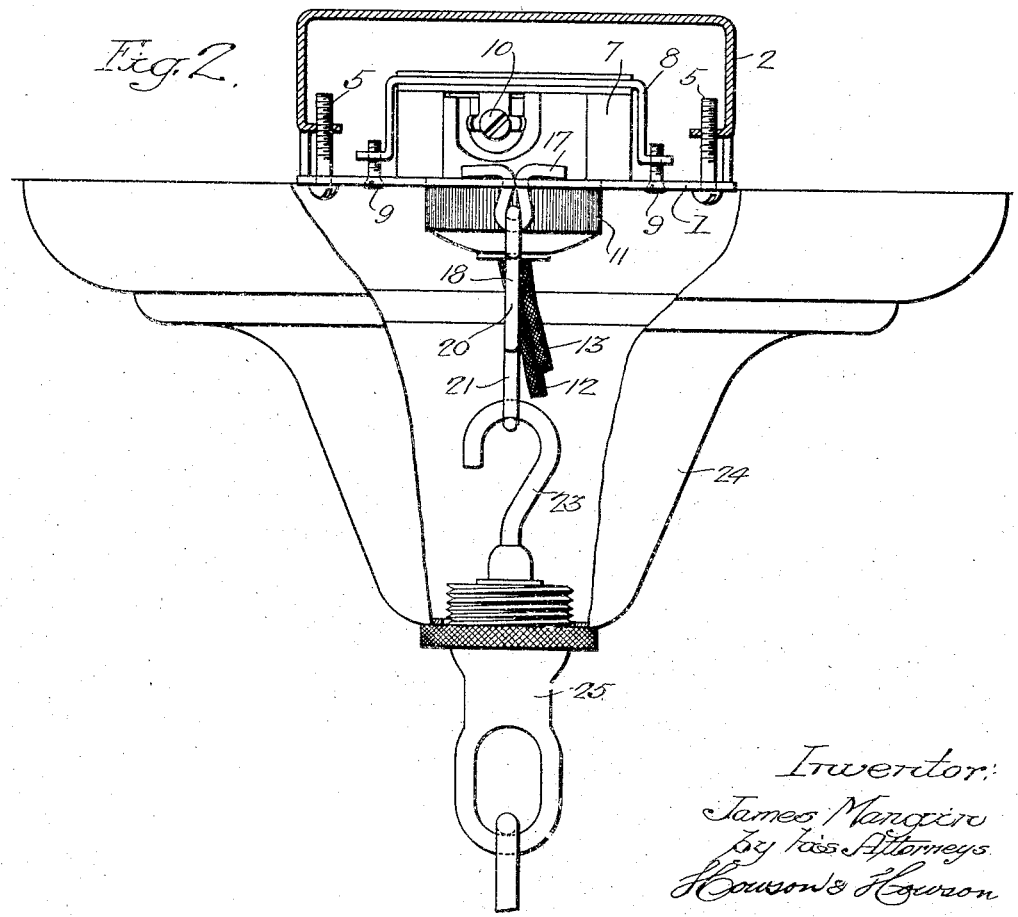

Patented Mar. 10, 1931

1,796,036

UNITED STATES PATENT OFFICE

JAMES MANGIN, OF NEW BRUNSWICK, NEW JERSEY

COMBINATION RECEPTACLE AND SUPPORT FOR ELECTRIC FIXTURES

Application filed March 24, 1930. Serial No. 438,567.

The present invention relates to devices for supporting and electrically connecting ceiling fixtures to outlet boxes without necessitating the splicing of the fixture wires to the line wires in an outlet box and particularly refers to a combined receptacle and support constructed as part of a cover of a ceiling outlet box. The device is a modification of the invention disclosed in my co-pending application, Serial No. 438,568, filed March 24, 1930, which discloses a similar device for supporting and connecting wall fixtures.

Heretofore, in hanging fixtures, it had been necessary to provide a strap or some other support for holding the ceiling fixture in co-operative relation with the outlet box and required the splicing of the fixture wires to the line wires of the outlet box to provide an electrical connection for the fixture. By the use of the device of my invention all such splicing is eliminated by reason that I provide a receptacle constructed as part of the cover of an outlet box which is connected to the line wires in the course of the electrical installation of a dwelling or building and becomes a part of the electric wiring. The device also provides means for suspending a ceiling fixture from the cover of the outlet box and is arranged so that a cooperating plug, attached to the fixture conductors, may be inserted into the receptacle provided in the cover of the outlet box. Therefore, the principal object of the invention is to provide a combined receptacle and support for ceiling fixtures whereby a fixture may be attached thereto by merely inserting the plug into the receptacle and suspending the fixture from the supporting means thus eliminating splicing or otherwise connecting the wires of the fixture with the line wires of the outlet box.

Another object of the invention is to provide a device whereby the hanging of fixtures may be accomplished more easily and may be performed by an unskilled person.

Other objects and advantages of the invention will appear more fully hereinafter from the following detailed description taken together with the accompanying drawing, in which:

Fig. 1 is a perspective view of the cover plate of a ceiling outlet box provided with the receptacle and supporting means; and Fig. 2 is a partial sectional view of an outlet box with the cover attached thereto and showing a hanging fixture attached thereto, part of the fixture "bell" being broken away to show the cooperative relation of the suspension means and the connector members.

Referring to the drawings, the numeral 1 designates the usual cover of a ceiling outlet box 2 and provided with an aperture 3 and a recess 4 for the reception of screws 5 whereby the cover 1 may be attached to the outlet box 2. A centrally located aperture 6 is provided in the cover for the reception of a receptacle 7 which is attached to the cover by means of the bracket 8 and the screws 9. The receptacle is provided with the usual terminal connections 10 for connecting the receptacle to the line wires in the outlet box. The cooperating connector member 11 is provided for plugging engagement with the receptacle 7 and is electrically connected to the fixture wires 12 and 13 whereby the fixture is electrically connected to the line wires (not shown) of the outlet box. Diametrically opposed recesses 14 and 15 are provided on the cover 1 on either side of the centrally located aperture 6 for the reception of a pair of looped members 16 and 17. A bracket 18 is provided with a looped portion 21 which is constricted at 22 and adapted to receive a hook member 23 located inside the bell 24 to support the electric fixture 25. The constricted portion 22 is provided to prevent the hook member 23 from being easily dislodged from the loop 21 of the bracket 18 when in engagement therewith. The bracket 18 is freely movable in the looped members 16 and 17 so that the bracket may be raised to a horizontal position to facilitate in the insertion of the plug member 11 into the receptacle 7. After the plug member 11 is in engagement with the receptacle, the bracket is permitted to return to its normally vertical position so that the fixture 25 may be suspended from the bracket by means of the hook member 23. It will be apparent from the illustration in Fig. 2 that the hanging of a ceiling fixture is quite simple and may be accomplished by any unskilled person without having to splice any wires or make any electrical connections other than the inserting of the plug 11 into the receptacle 7. It is obvious that the bracket 18 may take any other form than that shown and may be pivotally suspended from the cover 1 by other means than the loop members 16 and 17 which simply illustrate the operating principle of the device.

While I have shown only one modification of the invention for purposes of illustration and description, other changes and modifications may be apparent to those skilled in the art and I, therefore, desire to be limited only by the scope of the appended claims.

I claim:

1. The combination with an outlet box having a cover, of a pair of standard connector members, one of which is provided with electrical contacts for plugging engagement with the other, the former being centrally located with and attached to said cover and the latter adapted to be electrically connected to a lighting fixture, supporting means removably attached to said cover, and means pivotally mounted on and suspended from said supporting means for supporting said lighting fixture so that it may be electrically connected to said first connector member.

2. A combined electrical receptacle and support for lighting fixtures comprising a cover for an outlet box, a pair of standard connector members, one of which is provided with electrical contacts for plugging engagement with the other, the former being centrally located with and attached to said cover and the latter adapted to be electrically connected to a lighting fixture, a plurality of supporting members removably attached to said cover, and a suspending bracket pivotally mounted on and suspended from said supporting members for supporting said lighting fixture.

3. A combined electrical receptacle and support for lighting fixtures comprising a cover for an outlet box, said cover having a centrally located aperture, a pair of standard connector members, one of which is provided with electrical contacts for plugging engagement with the other, the former being located in said aperture and attached to said cover and the latter adapted to be electrically connected to a lighting fixture, supporting means removably attached to said cover, and means carried by and suspended from said supporting means normally in vertical alignment with said first connector member for supporting said lighting fixture, said means being connected in hinged relation to said cover whereby it may be swung into a horizontal position to clear said first connector member so that said second connector member may be plugged into said first connector member and then said means returned to its normal vertical position to support said lighting fixture.

4. A combined electrical receptacle and support for lighting fixtures comprising a cover for an outlet box, said cover having a centrally located aperture, a pair of standard connector members, one of which is provided with electrical contacts for plugging engagement with the other, the former being located in said aperture and attached to said cover and the latter adapted to be electrically connected to a lighting fixture, a plurality of supporting members removably attached to said cover, and a suspending bracket carried by and suspended from said supporting members normally in substantial vertical alignment with said first connector member for supporting said lighting fixture, said bracket being connected in hinged relation to said cover on each side of said first connector member, whereby it may be swung into a horizontal position to clear said first connector member so that said second connector member may be plugged into said first connector member and then said bracket returned to its normal vertical position to support said lighting fixture.

5. A combined electrical receptacle and support for lighting fixtures comprising a cover for an outlet box, said cover having a centrally located aperture, a pair of standard connector members, one of which is provided with electrical contacts for plugging engagement with the other, the former being located in said aperture and attached to said cover and the latter adapted to be electrically connected to a lighting fixture, a plurality of looped members removably attached to said cover, and a suspending Y-shaped bracket carried by and suspended from said looped members normally in substantial vertical alignment with said first connector member for supporting said lighting fixture, said bracket having its ends connected in hinged relation to said cover on each side of said first connector member whereby it may be swung into a horizontal position to clear said first connector member so that said second connector member may be plugged into said first connector member and then said bracket returned to its normal vertical position to support said lighting fixture.

6. A combined electrical receptacle and support for lighting fixtures comprising a cover for an outlet box, said cover having a centrally located aperture, a pair of standard connector members, one of which is provided with electrical contacts for plugging engagement with the other, the former being located in said aperture and attached to said cover and the latter adapted to be electrically connected to a lighting fixture, a plurality of looped members removably attached to said cover, and a suspending Y-shaped bracket carried by and suspended from said looped members normally in substantial vertical alignment with said first connector member for supporting said lighting fixture, said bracket having a constricted loop at its Y junction whereby said lighting fixture may be substantially locked therein and said bracket having its ends connected in hinged relation to said cover on each side of said connector member whereby it may be swung into a horizontal position to clear said first connector member so that said second connector member may be plugged into said first connector member and then said bracket returned to its normal vertical position to support said lighting fixture in said loop.

JAMES MANGIN.